Sept. 2, 1958 W. BRANDL 2,850,611
TEMPERATURE-CONTROLLED HEATING ELEMENT
Filed Oct. 19, 1955
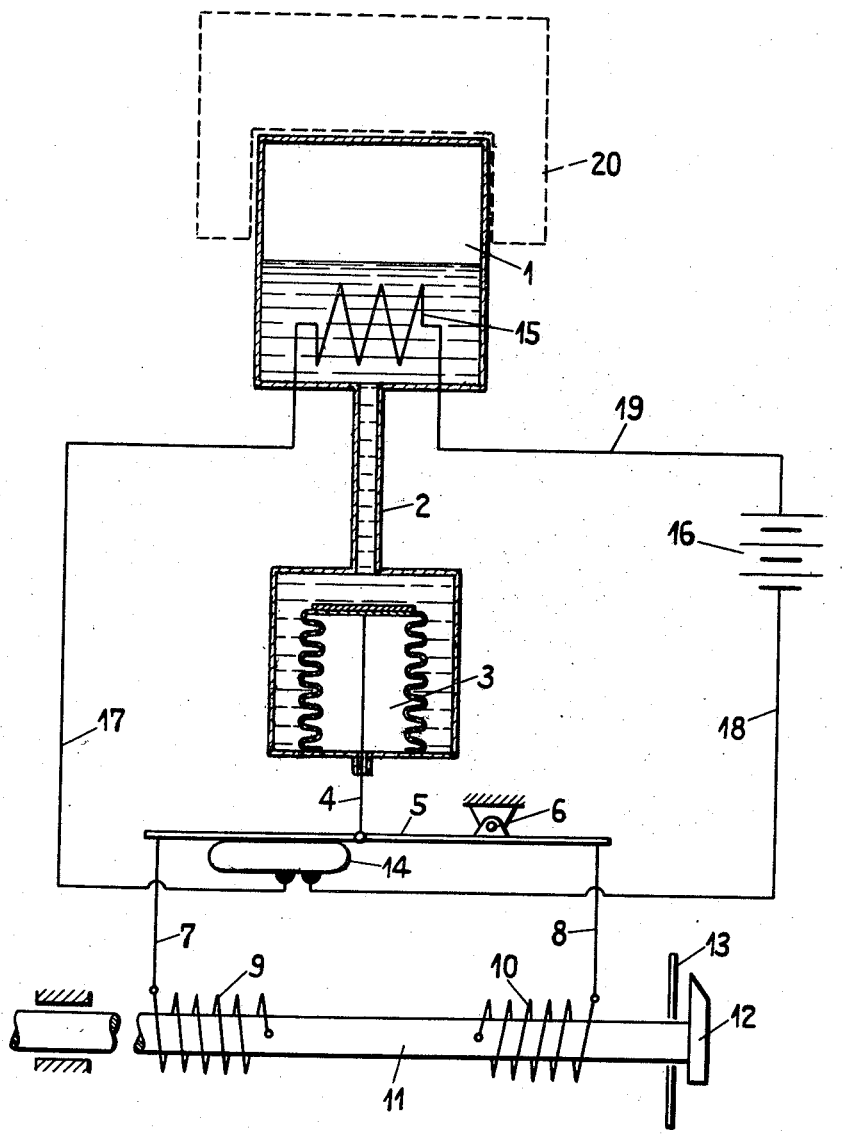

United States Patent Office 2,850,611
Patented Sept. 2, 1958

2,850,611

TEMPERATURE-CONTROLLED HEATING ELEMENT

Willi Brandl, Zurich, Switzerland

Application October 19, 1955, Serial No. 541,450

Claims priority, application Switzerland October 22, 1954

3 Claims. (Cl. 219—20)

My invention relates to a temperature-controlled heating element.

It is the object of the present invention to provide a temperature-controlled heating element, such as a radiator, with improved means for maintaining its temperature constant, such improved means being simple, reliable and accurate in operation and having a long life.

Further objects of my invention will appear from a detailed description of a preferred embodiment thereof following hereinafter with reference to the accompanying drawing, it being understood, however, that such detailed description serves the purpose of illustrating rather than that of limiting or restricting my invention. The accompanying drawing illustrates a sectional view of the novel heating element and the control means associated therewith.

The heating element 1 which may serve the purpose of heating the contents of a vessel 20 is formed by a container containing a suitable medium, preferably a liquid medium, such as water. A pressure-sensitive element, such as a pressure gauge, mounted to be subject to the pressure of the medium is suitably connected with the container 1, for instance by means of a pipe 2. The pressure gauge may be of any suitable type, for instance of the type containing a flexible boot as shown surrounding an axially movable rod 4 and connected to a plate secured to the upper end of rod 4. The pressure gauge serves the purpose of controlling the heat supplied to the heating element 1.

In the embodiment shown, the heat is supplied by an electrical resistance 15 disposed within the container and electrically connected by leads, 17, 18 and 19 in a circuit with an electrical battery 16 and with a mercury switch 14. The latter is suitably connected with the pressure gauge and adapted to be rocked in a manner interrupting the electrical circuit when the temperature and the consequent pressure prevailing in the container 1 increase beyond a certain limit, and closing the electrical circuit when the temperature and the pressure drop below said limit.

In the embodiment shown, I have provided a pivotal controlling member in form of a two-armed lever 5 fulcrumed by a pivot 6 on a stationary bracket and suitably connected to the rod 4 of the pressure gauge. The mercury switch 14 is fixed to the lever 5 and is thereby adapted to close or interrupt the electrical circuit in response to the pivotal movement imparted to the lever 5 by the pressure gauge 3.

For the purpose of adjusting the temperature limit at which the mercury switch is actuated, suitable means are connected to the arms of lever 5 for selectively biassing one or the other arm. In the embodiment shown, such means comprises a pair of springs 9 and 10 which are connected to the arms of lever 5 by rods 7 and 8, and are furthermore connected to an adjustable shaft 11. By adjustment of the shaft the springs may be biassed. In the embodiment shown, the springs 9 and 10 are helical springs surrounding the shaft 11 and being of opposite hand so that rotation of shaft 11 increases the pull exerted on one of the rods 7, 8 and at the same time reduces the pull exerted on the other one of the rods 7, 8. The shaft 11 is provided with a knob 12 having a mark cooperating with a suitable graduation 13 provided on a stationary frame plate. By a suitable detent not shown the shaft 11 is held in adjusted position. On the graduation the temperature may be read on which the heating element 1 is maintained automatically. Preferably, the pressure prevailing in the container 1 is reduced, the container being partly evacuated.

In lieu of an electrical heating element, such as 16, any other suitable heating element may be used, for instance a heating element heated by steam or gas. In lieu of the pressure gauge shown in the drawing a pressure gauge having a simple diaphragm may be used.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Temperature-controlled heating element comprising a sealed container containing a medium, an electrical heater for heating the medium, a pressure-sensitive element mounted to be subject to the pressure of said medium, a pivotal controlling member connected to said pressure-sensitive element for pivotal movement thereby and having a mercury switch thereon operatively connected to said electrical heater adapted to put said electrical heater into and out of operation in response to pivotal movement of said controlling member, said pivotal controlling member having a pair of arms, and adjusting means connected to each of said arms for selectively biasing one or the other one of said arms to control operation of said mercury switch to maintain the temperature of said medium at a predetermined adjusted value.

2. Temperature-controlled heating element comprising a sealed container containing a medium, heating means for heating the medium, a pressure-sensitive element mounted to be subject to the pressure of said medium, a pivotal controlling member connected to said pressure-sensitive element for pivotal movement thereby and having control means thereon operatively connected to said heating means to control the heat produced thereby, said pivotal controlling member having a pair of arms, and adjusting means connected to each of said arms for selectively biasing one or the other one of said arms to control operation of said control means to maintain the temperature of said medium at a predetermined adjusted value, said adjusting means for each of said arms comprising a spring connected to its associated arm, said springs respectively urging their arms in opposite directions, and an adjustable shaft connected to said springs for biasing the same.

3. Temperature-controlled heating element comprising a sealed container containing water, an electrical resistance disposed in said container for heating said water thereby changing the steam pressure thereof, a pressure gauge connected with said container to be responsive to said steam pressure, a pivotal controlling member having a pair of arms connected to said pressure gauge to be rocked thereby, a mercury switch mounted on one of said arms and electrically connected to said resistance and adapted to put the same into and out of operation, a spring connected to each arm; and adjustable means for biassing said springs in opposite sense to selectively set the temperature at which said mercury switch will be actuated.

References Cited in the file of this patent

UNITED STATES PATENTS

| | | |
|---|---|---|
| 516,167 | Rider et al. | Mar. 6, 1894 |
| 1,691,666 | Moffly | Nov. 13, 1928 |
| 1,874,909 | Conklin | Aug. 30, 1932 |
| 2,611,850 | Walton | Sept. 23, 1952 |
| 2,617,595 | Alban et al. | Nov. 11, 1952 |